United States Patent Office 3,663,709
Patented May 16, 1972

---

3,663,709
NEMATOCIDAL USE OF PHENYLTHIOMETHYL N-METHYLDITHIOCARBAMATE
John J. D'Amico, Akron, Ohio, and David L. Gerwitz, Kirkwood, Mo., assignors to Monsanto Company, St. Louis, Mo.
No Drawing. Filed Dec. 15, 1969, Ser. No. 885,359
Int. Cl. A01n 9/12
U.S. Cl. 424—300                                4 Claims

ABSTRACT OF THE DISCLOSURE

The life cycle of parasitic nematodes is terminated by applying a nematocidal amount of phenylthiomethyl N-methyldithiocarbamate to nematode infested soil.

---

This invention relates to methods of terminating the life cycle of parasitic nematodes employing a nematocidal amount of phenylthiomethyl N-methyldithiocarbamate

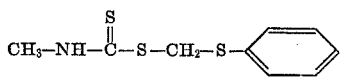

an amber oil soluble in diethyl ether, acetone, ethanol and benzene. It is readily prepared by adding slowly substantially one molecular proportion of phenylthiomethyl chloride (an oil prepared in accordance with the procedure of U.S. 2,827,492 from paraformaldehyde, concentrated hydrochloric acid and thiophenol in benzene) to an aqueous-ethanol solution of substantially one molecular proportion of ammonium N-methyldithiocarbamate while agitating same at about 30° C. and thereafter isolating the amber oil product by conventional means.

As illustrative of the nematocidal activity of the compound of this invention but not limitative thereof as compared to analogues thereof is the following:

A 3-week old culture of the DD–136 strain of *Neoaplactana carpocapsae* Weiser (a parasitic nematode infestation of the codling moth larvae and other insect hosts) is placed on the surface of a suitable agar medium to provide a concentration of approximately 50 to 100 nematodes per ml. To each of 96 round bottom 3 ml. wells of a single tray is added the compound to be evaluated as itemized below as 0.2 ml. of an acetone solution thereof to provide a concentration of 100 p.p.m. of said compound. To each well as then added 1.8 ml. of the said culture-agar mix. The respective wells are then totally covered with an 0.125″ sheet of plexiglass and incubated for 14 days at 68° F. Thereupon mortality observations were made. The results observed follow:

| Compound: | Percent kill |
|---|---|
| Phenylthiomethyl N-methyldithiocarbamate | 100 |
| Phenylthiomethyl N-ethyldithiocarbamate | 0 |
| p-Chlorophenylthiomethyl N-ethyldithiocarbamate | 0 |
| Ethyl 3-(methylthio)dithiocarbanilate | 0 |

The nematocide of this invention was found also to be highly effective in the control of the life cycle of root knot worm nematodes, Meloidogyne spp., in their soil habitats.

The life cycle of parasitic nematodes is readily terminated by exposing same to a nematocidally effective amount of a compound of this invention. The nematocidal compound of this invention is used per se but preferably in diluted form, e.g. sprays in liquid or dust form employing well known nematocidal adjuvants, to the nematode parasite or locus thereof to be protected.

The exact concentration of the nematocide of this invention employed in combatting or controlling parasitic nematodes can vary considerably provided the required dosage (i.e. nematocidal amount) thereof is supplied to the nematode or to the environment of the nematode. When the extending agent is a liquid, the concentration of phenylthiomethyl N-methyldithiocarbamate employed to supply the desired dosage will be in the approximate range of 0.001 to 50 percent by weight. When the extending agent is a semi-solid or solid, the concentration of the nematocide of this invention employed to supply the desired dosage generally will be in the range of 0.1 to 25 percent by weight. The amount of active ingredient in a concentrate, which normally will be mixed with an extender, is 5 to 95 percent by weight.

The compound of this invention is incorporated in a nematode-infested soil for control thereof at a rate of about 15 to about 75 lbs. per acre. The compound is employed as a spray or particulate solid composition for soil incorporation purposes. It is highly stable in soil.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the examples and description set forth herein but rather the claims be construed as encompassing all the features of patentable novelty which resides in the present invention including all features which would be treated as equivalents thereof by those skilled in the art to which the invention pertains.

What is claimed is:

1. A method for terminating the life cycle of parasitic nematodes which comprises exposing same to a nematocidally effective amount of phenylthiomethyl N-methyldithiocarbamate.

2. A method of claim 1 wherein phenylthiomethyl N-methyldithiocarbamate is incorporated in a nematode infested soil at a rate of about 15 to about 75 pounds per acre.

3. The method of claim 1 wherein the parasitic nematodes are Meloidogyne spp.

4. The method of claim 2 wherein the nematodes are Meloidogyne spp.

References Cited

UNITED STATES PATENTS

| | | | |
|---|---|---|---|
| 2,827,492 | 3/1958 | Fancher | 260—609 |
| 3,075,875 | 1/1963 | Margot | 260—455 X |
| 3,202,572 | 8/1965 | Werres et al. | 260—455 X |
| 3,265,562 | 8/1966 | Watts | 260—455 X |
| 3,284,184 | 11/1966 | Zerbe et al. | 260—455 X |
| 3,324,162 | 6/1967 | Nyquist et al. | 260—455 |

ALBERT T. MEYERS, Primary Examiner

L. SCHENKMAN, Assistant Examiner

U.S. Cl. X.R.

260—455